(12) United States Patent
Nakagawa

(10) Patent No.: US 8,272,116 B2
(45) Date of Patent: Sep. 25, 2012

(54) METHOD OF FIXING BOOT

(75) Inventor: Naoki Nakagawa, Iwata (JP)

(73) Assignee: NTN Corporation, Osaka (JP)

( * ) Notice: Subject to any disclaimer, the term of this patent is extended or adjusted under 35 U.S.C. 154(b) by 137 days.

(21) Appl. No.: 12/452,879

(22) PCT Filed: Jul. 25, 2008

(86) PCT No.: PCT/JP2008/001990
§ 371 (c)(1),
(2), (4) Date: Jan. 27, 2010

(87) PCT Pub. No.: WO2009/016813
PCT Pub. Date: Feb. 5, 2009

(65) Prior Publication Data
US 2010/0130294 A1 May 27, 2010

(30) Foreign Application Priority Data

Jul. 31, 2007 (JP) .................................. 2007-198336
Aug. 28, 2007 (JP) .................................. 2007-221084

(51) Int. Cl.
*B23P 17/00* (2006.01)
*F16D 3/84* (2006.01)
(52) U.S. Cl. ........................ 29/419.2; 464/175; 464/906
(58) Field of Classification Search ................. 464/175, 464/173, 174; 403/50, 51; 277/634–636; 74/18–18.2; 29/419.2, 505
See application file for complete search history.

(56) References Cited

U.S. PATENT DOCUMENTS

| 5,672,113 A | 9/1997 | Tomogami et al. |
| 5,879,238 A * | 3/1999 | Breheret ........................ 464/175 |
| 6,244,967 B1 * | 6/2001 | Takabe et al. ................. 464/175 |
| 7,657,975 B2 * | 2/2010 | Ogino et al. |
| 2005/0173872 A1 | 8/2005 | Ogino |

FOREIGN PATENT DOCUMENTS

| GB | 2 282 208 | 3/1995 |
| JP | 2-168024 | 6/1990 |
| JP | 7-145863 | 6/1995 |
| JP | 8-309925 | 11/1996 |
| JP | 2004-11759 | 1/2004 |
| JP | 2007-155002 | 6/2007 |
| WO | WO 2006035832 | * 4/2006 |

OTHER PUBLICATIONS

International Search Report for PCT/JP2008/001990, mailed on Nov. 4, 2008.
English Translation of the International Preliminary Report on Patentability issued Feb. 24, 2010 in corresponding International Patent Application PCT/JP2008/001990.
Japanese Office Action mailed Jun. 19, 2012 issued in corresponding Japanese Patent Application No. 2007-198336.

* cited by examiner

*Primary Examiner* — Gregory Binda
*Assistant Examiner* — Josh Skroupa

(57) ABSTRACT

A method for fixing a boot includes mounting a tubular anchoring areas, defined in opposite ends of a resinous boot, on an outer periphery of a counterpart member, and applying a clamping force to boot bands mounted around respective outer peripheries of the tubular anchoring areas to thereby fix the tubular anchoring areas to the outer periphery of the counterpart member. Coils are disposed around respective outer peripheries of the boot bands to generate an induction current in the boot bands. In this way, a reactive force of the magnetic field is generated between the coils and the boot bands to plastically deform the boot bands and reduce their diameters, whereby the tubular anchoring areas are fixed to the outer periphery of the counterpart member.

7 Claims, 6 Drawing Sheets

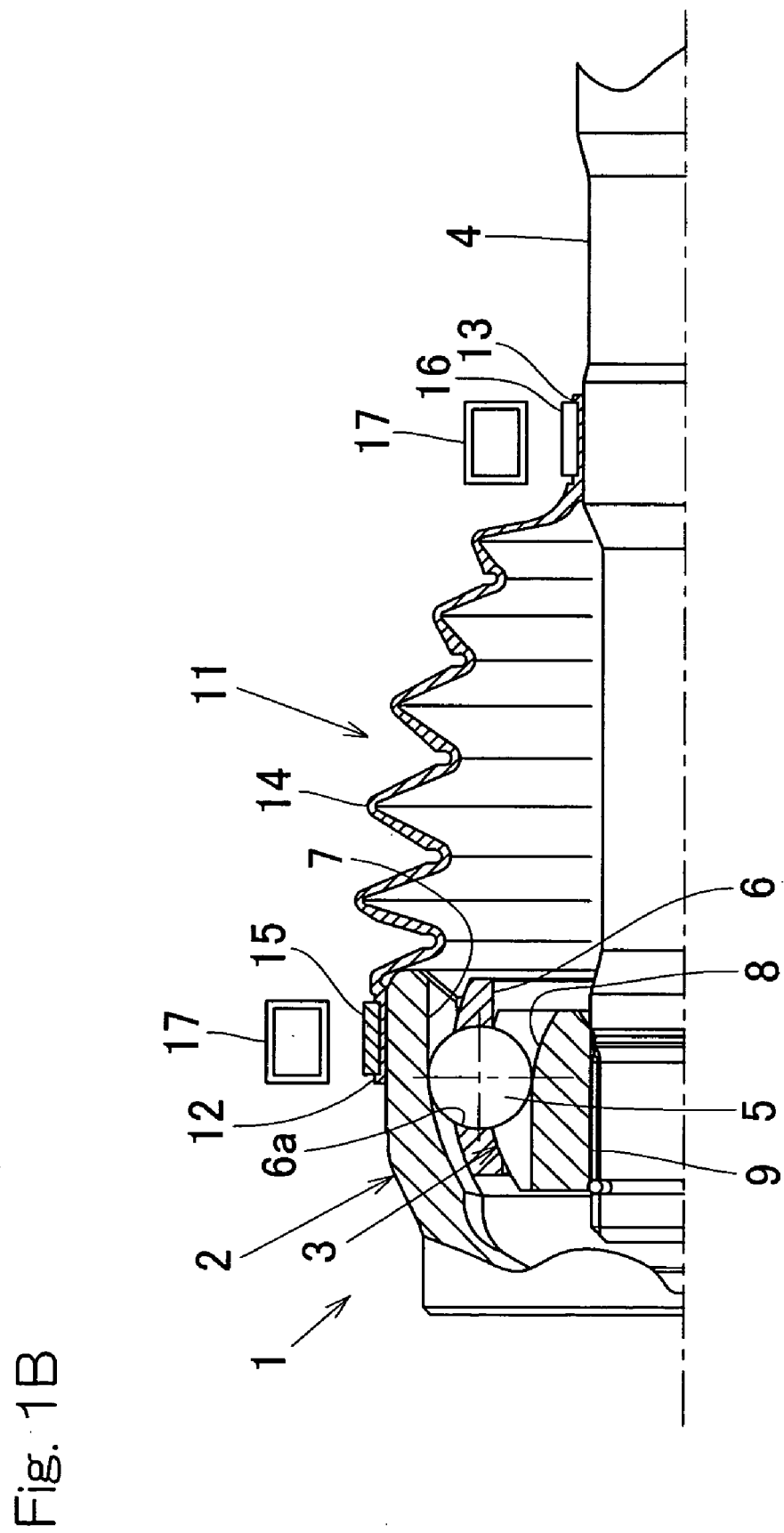

METHOD OF FIXING BOOT

CROSS REFERENCE TO RELATED APPLICATIONS

This application claims the benefit under 35 U.S.C. Section 371, of PCT International Application No. PCT/JP2008/001990, which claimed priority to Japanese Patent Application No. 2007-198336, filed Jul. 31, 2007, and Japanese Patent Application No. 2007-221084 filed Aug. 28, 2007, which are incorporated by reference in their entireties into this application.

BACKGROUND OF THE INVENTION

1. Field of the Invention

The present invention relates to a method of fixing a flexible boot made of a resinous material to a counterpart, for example, a constant velocity universal joint, used in association with a drive shaft of an automotive vehicle and in various industrial machines and equipments.

2. Description of the Related Art

As is well known to those skilled in the art, the constant velocity universal joint employed in, for example, an automotive vehicle has a tubular flexible boot made of a resinous material or synthetic resin employed therein for the purpose of preventing foreign matter such as, for example, dusts from intruding into the constant velocity universal joint and/or preventing a grease, filled inside the constant velocity universal joint, from leaking therefrom to the outside. Fixture of the tubular boot to the constant velocity universal joint is generally carried out by mounting the flexible boot on the constant velocity universal joint with annular anchoring portions thereof at its opposite ends encircling an outer ring and an inner ring axle, respectively, and firmly fastening a flexible metal hoop exteriorly around each of the annular anchoring portion of the boot.

In order to secure a sufficient sealability required at each of the annular anchoring portions of the flexible boot relative to the outer ring or the inner ring axle for the intended purposes, the metal hoop must be fastened under a predetermined interference. However, considering the functionality of the constant velocity universal joint, the constant velocity universal joint must have a working angle on an outboard side, which is greater than that on an inboard side and, accordingly, leakage of the grease tends to occur at the outboard joint where the annular anchoring portion of the boot is fixed to the outer ring of the constant velocity universal joint.

In view of the above, the JP Laid-open Patent Publication No. 07-145863, for example, suggests fixture of the annular anchoring portion of the boot to the outer ring of the constant velocity universal joint, in which annular protrusions are formed integrally with the anchoring portion of the boot so as to project radially outwardly and inwardly therefrom, respectively, and, on the other hand, a similarly annular groove is formed in an outer peripheral surface of the outer ring. In this known boot fixing method, the annular protrusion projecting radially inwardly from the anchoring portion is engaged in the annular groove defined in the outer ring, and a metal hoop then encircled exteriorly around the anchoring portion is firmly fastened to fix that anchoring portion to the outer ring.

According to the above described boot fixing method, when the metal hoop is so fastened, the annular protrusion projecting radially outwardly from the anchoring portion is radially inwardly compressed by a clamping force exerted by the metal hoop, accompanied by an elastic deformation of the annular protrusion projecting radially inwardly from the anchoring portion to allow the annular protrusion to be urged into the annular groove to thereby achieve a tight connection between the anchoring portion and the outer ring.

It has however been found that the known boot fixing method discussed above has a disadvantage in that since the flexible boot anchoring portion has a complicated shape, the cost of manufacture of the boot tends to increase. Also, considering that the available space is limited on the side of the outer ring of the constant velocity universal joint, formation of the annular protrusion on the outer periphery of the anchoring portion requires a contrived design setup. Furthermore, in the event that a hard matter, such as a stone, collides against the annular protrusion on the outer periphery of the anchoring portion during travel of the automotive vehicle, another problem occurs that the clamping force is so lowered as to impair the sealability.

SUMMARY OF THE INVENTION

In view of the foregoing, the present invention has for its essential object to provide a method of fixing the flexible boot, which is effective to secure a high sealability at each of the anchoring portions without incurring an increase of the cost.

A method for fixing a boot to a counterpart member of the present invention includes the steps of mounting a tubular anchoring area, defined in one end of the boot made of a resinous material, on an outer periphery of the counterpart member, applying a clamping force to a boot band mounted around an outer periphery of the tubular anchoring area to thereby fix the tubular anchoring area to the outer periphery of the counterpart member, and positioning around the outer periphery of the boot band, a magnetic generating device for applying a magnetic repulsion force to the tubular anchoring area to thereby enable the boot band to be plastically deformed to have a reduced diameter by means of the magnetic repulsion force. In this way, the tubular anchoring area is fixed to the outer periphery of the counterpart member.

According to this method, since the magnetic repulsion force generated by the magnetic generating device is utilized, a pressing force can be applied uniformly to the entire outer periphery of the counterpart member and the tubular anchoring area of the boot and, therefore, a high sealability can be secured at the mounting area where the tubular anchoring area is fixed. Also, since as is the case with the conventional counterparts, the tubular anchoring area need not have a complicated shape, no cost increase arises.

In a preferred embodiment of the present invention, the magnetic generating device may include a coil, which generates an induction current in the boot band, when an electric current is supplied to the coil, to cause the magnetic repulsion force to be developed between the coil and the boot band. By so doing, the tubular anchoring area of the boot can be fixed to the counterpart member with a simple structure.

In another preferred embodiment of the present invention, the counterpart member may include one or both of a shaft, which is mounted on an inner periphery of an inner joint member of a constant velocity universal joint comprising the inner joint member and an outer joint member that are relatively rotatably connected with each other for transmission of a torque therebetween, and the outer joint member of the constant velocity universal joint.

In the constant velocity universal joint, the tubular boot made of a resinous material is employed therein for the purpose of preventing foreign matter such as, for example, dusts from intruding into the constant velocity universal joint and/or preventing a grease, filled inside the constant velocity universal joint, from leaking therefrom to the outside. When the boot fixing method of a kind described hereinabove is employed in fixing the tubular anchoring area of the boot at opposite ends of the boot to the outer joint member and the shaft, the above described sealability can be secured and, therefore, an undesirable ingress of dusts into the constant velocity universal joint and a similarly undesirable leakage of the grease from inside of the constant velocity universal joint can be avoided.

The boot band referred to above is preferably in the form of an annulus having a flat outer peripheral surface over an entire circumference thereof. The use of the annulus of the type referred to above is effective to enable the boot band to have a simplified shape and, accordingly, in engaging the tubular anchoring area of the boot firmly around the outer joint member of the constant velocity universal joint, a relatively large space can be secured around the outer joint member of a type having a limited space.

The boot band is preferably made of an aluminum or a stainless steel.

The boot band preferably has a wall thickness not greater than 3 mm. By so selecting, a function of plastically deforming the boot band by the utilization of a reactive force in a magnetic field can be secured easily.

The present invention also provides a constant velocity universal joint of a type, in which the boot is fixedly mounted on an outer joint member and a shaft. Specifically, this constant velocity universal joint includes an inner joint member and an outer joint member which are relatively rotatably connected with each other for transmission of a torque therebetween, a shaft having the inner joint member mounted thereon, a boot made of a resinous material and mounted on a portion of the shaft adjacent the inner joint member, the boot having first and second tubular anchoring areas, defined in opposite ends of the boot, respectively, and mounted on an outer periphery of the shaft and an outer periphery of the outer joint member, respectively, and a boot band mounted around each of those first and second tubular anchoring areas of the boot for fixedly clamping the respective tubular anchoring area to the outer periphery of each of the shaft and the outer joint member. One or both of the first and second anchoring areas of the boot is/are plastically deformed to have a reduced diameter by means of a magnetic repulsion force developed by the above method and applied to the boot band or bands, whereby the tubular anchoring area or areas is/are fixed to the outer periphery of the shaft or/and the outer periphery of the outer joint member.

According to the constant velocity universal joint of the type referred to above, sealability can be secured at the mounting area where the tubular anchoring area is fixed, and, accordingly, an undesirable ingress of dusts into the constant velocity universal joint and a leakage of a grease from inside of the constant velocity universal joint can be avoided.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 1B is a view similar to FIG. 1A, showing boot bands fastened to anchor opposite ends of a flexible boot to an outer ring and an inner ring axle;

DESCRIPTION OF THE PREFERRED EMBODIMENTS

Figure 1A:
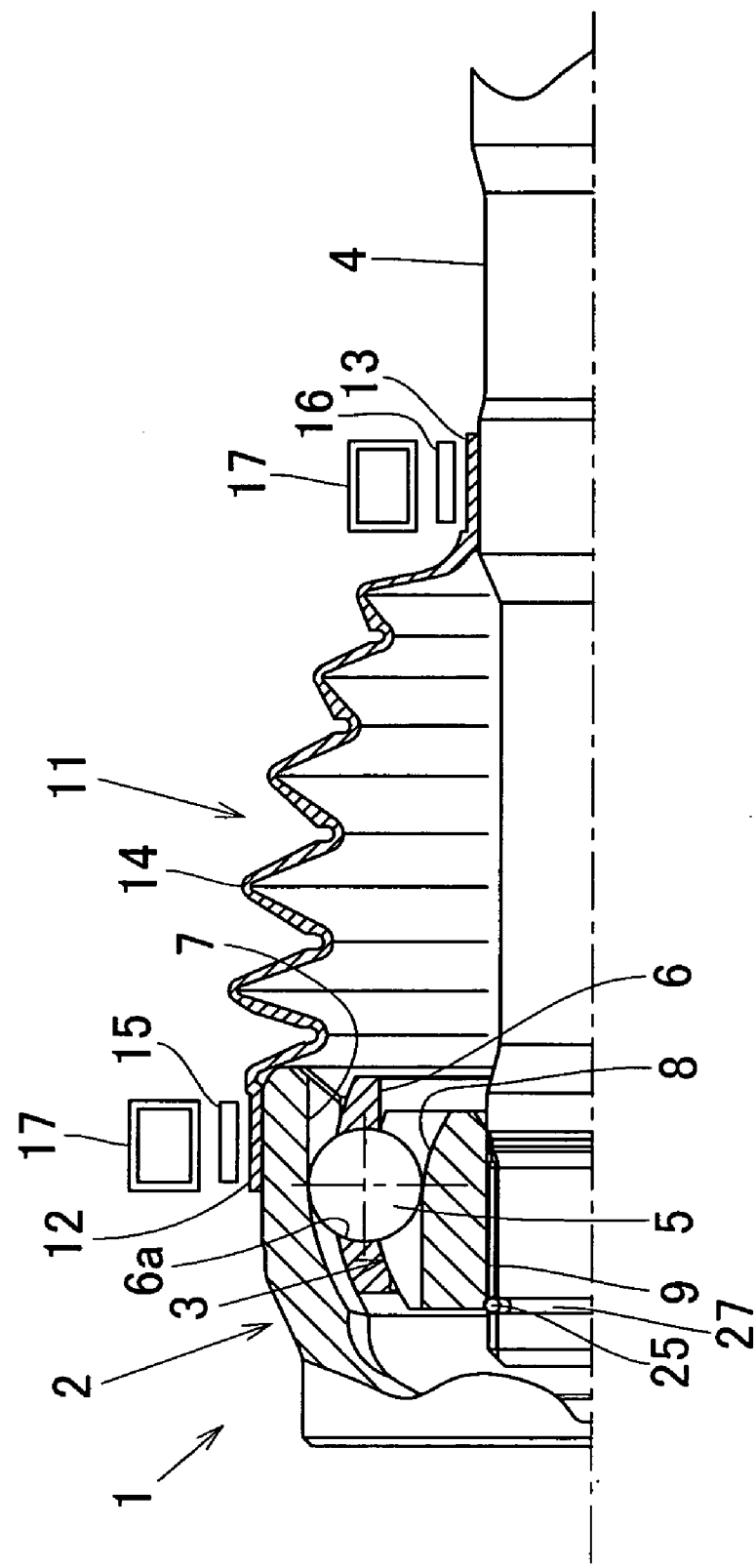
FIG. 1A is a fragmentary longitudinal sectional view, showing an upper longitudinal half of a constant velocity universal joint according to a preferred embodiment of the present invention, prior to fixing of boot bands.
Figure 2:
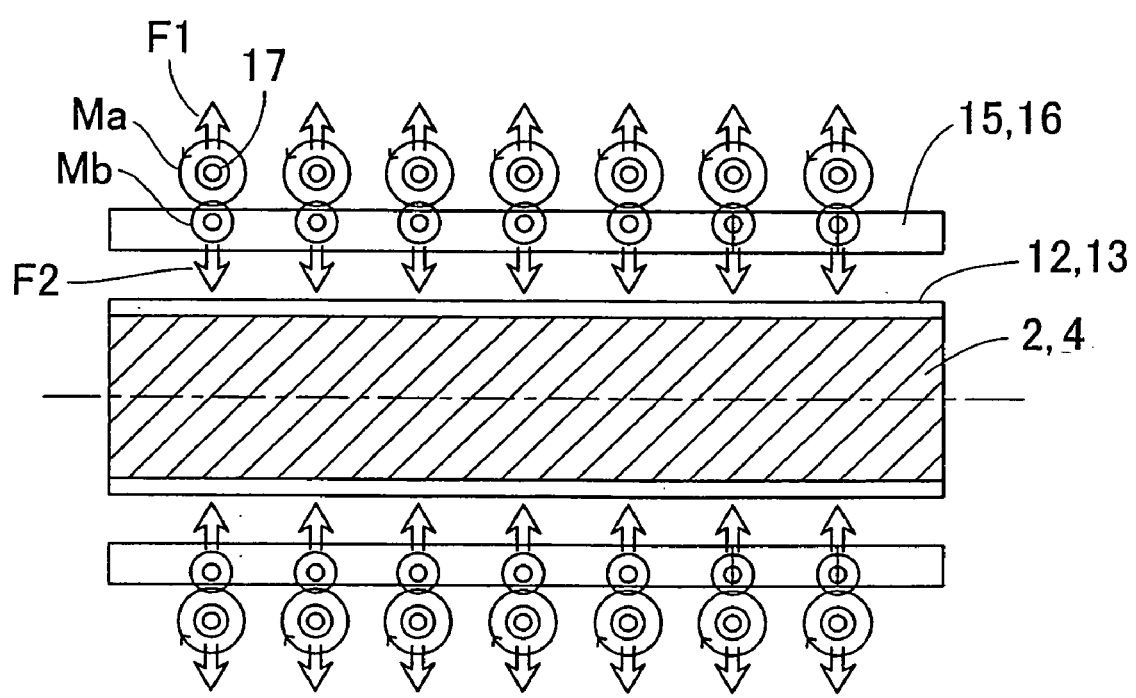
FIG. 2 is an explanatory diagram showing how a reactive force is developed in a magnetic field when an electric current is supplied to coils during the practice of the boot fixing method of FIGS. 1A and 1B.

Referring to FIGS. 1A, 1B and 2, a preferred embodiment of the present invention will be described in detail. The illustrated constant velocity universal joint generally identified by 1 is of a fixed type and includes an outer joint member or an outer race 2, an inner joint member or an inner race 3, a shaft 4, a plurality of rolling elements 5 in the form of torque transmitting balls, and a cage 6 for retaining the torque transmitting balls 5 in a circumferential row. The outer joint member 2 is comprised of a joint bell or a cup portion shown in FIG. 1A, and a joint journal or a stem portion (both not shown). The joint bell forming a part of the outer joint member 2 has an inner surface shaped to represent a substantially semispherical shape and formed with a plurality of, for example, six or eight, axially extending track grooves 7. On the other hand, the inner joint member 3 has an outer surface shaped to represent a substantially semispherical shape and formed with axially extending track grooves 8 equal in number to the number of the track grooves 7 in the joint bell of the outer joint member 2 and radially aligned with those track grooves 7.

The inner joint member 3 has a center bore 9 defined therein and also has an inner peripheral surface formed with serrations or spline projections defined therein so as to extend axially thereof, and the shaft 4 has one end inserted into and splined to the center bore 9 of the inner joint member 3 for rotation together with the latter. The shaft 4 is non-detachably coupled with the inner joint member 3 by means of a circlip 25 engaged in a circumferentially extending mounting groove 27 defined in an outer peripheral surface of that end portion of the shaft 4. The cage 6 is a member for retaining the torque transmitting balls 5 in a circumferential row in the same plane and has a plurality of pockets 6a circumferentially defined therein with the torque transmitting balls 5 accommodated therein. With the assembly including the torque transmitting balls 5 and the cage 6 positioned intermediate between the outer joint member 2 and the inner joint member 3, the torque transmitting balls 5 are received in part in the track grooves 7 and in part in the track grooves 8 to allow the inner joint member 3 to undergo a rocking motion relative to the outer joint member 2, while connecting the outer joint member 2 and the inner joint member 3 through the torque transmitting balls 5 so as to rotate together. It is to be noted that although in this embodiment the inner joint member 3 and the shaft 4 have been shown and described as members separate from each other, the inner joint member 3 may be formed integrally with the shaft 4.

The constant velocity universal joint 1 of the structure described above makes use of a flexible boot 11, made of a resinous material such as, for example, a thermoplastic polyester elastomer or urethane, for the purpose of preventing foreign matter such as, for example, dusts from intruding into the constant velocity universal joint and/or preventing a grease, filled inside the constant velocity universal joint 1, from leaking therefrom to the outside thereof. This flexible boot 11 is of a barrel-shaped configuration having its opposite open ends defining respective anchoring areas 12 and 13 and also having a tubular bellows 14 intermediate between the anchoring areas 12 and 13 and is mounted on the constant velocity universal joint 1 so as to extend between the outer joint member 2 and a generally intermediate portion of the shaft 4 that is distant from the inner joint member 3. Annular boot bands 15 and 16 are disposed outside the anchoring areas 12 and 13, respectively.

The flexible boot 11 in this embodiment is mounted fixedly on the constant velocity universal joint 1, which is a counterpart member, with the opposite anchoring areas 12 and 13 clamped around an outer periphery of the outer joint member 2 and that intermediate portion of the shaft 4 remote from the inner joint member 3 by means of the respective boot bands 15 and 16 while the tubular bellows 14 covers another portion of the shaft 4 adjacent the inner joint member 3, that is, between the inner joint member 3 and the intermediate portion of the shaft 4.

More specifically, referring particularly to FIG. 1A, the flexible boot 11 is of one-piece construction including the tubular bellows 14 having its opposite open ends defining the respective boot anchoring areas 12 and 13, the boot anchoring area 12 having a diameter greater than that of the boot anchoring area 13. This flexible boot 11 is disposed around the constant velocity universal joint 1 with the large diameter anchoring area 12 and the reduced diameter anchoring area 13 mounted on the outer joint member 2 and the intermediate portion of the shaft 4, respectively. The boot anchoring areas 12 and 13 are clamped in positions between the outer periphery of the outer joint member 2 and the boot band 15 and between the intermediate portion of the shaft 4 and the boot band 16, respectively. In this condition, the tubular bellows 14 covers that portion of the shaft 4 between the inner joint member 3 and the intermediate portion of the shaft 4.

The boot anchoring areas 12 and 13 of the boot 11 may be mounted either loosely or in a form-fitting fashion on the outer joint member 2 and the intermediate portion of the shaft 4, respectively. As will be described in detail later, the boot bands 15 and 16 are disposed respectively around the boot anchoring areas 12 and 13. Each of the boot bands 15 and 16 is in the form of an annulus having a flat outer peripheral surface and also having a wall thickness of not greater than 3 mm and is made of an electroconductive material such as, for example, aluminum, or a metallic material such as, for example, stainless steel. The material forming each of the boot bands 15 and 16 is of a kind that can be readily plastically deformed to allow the respective boot band 15 and 16 to have a diameter reduced from the initial diameter thereof.

In order for the boot bands 15 and 16 to be plastically deformed to firmly clamp the boot anchoring areas 12 and 13 between the boot band 15 and the outer joint member 2 and between the boot band 16 and the intermediate portion of the shaft 4, respectively, coils 17 forming respective parts of a magnetic generating device for imparting a magnetic repulsion force are disposed around the associated boot bands 15 and 16 so that, when a precipitous electric current is supplied to the coils 17 to generate a rapidly enhancing magnetic field, an induction current can be induced in the boot bands 15 and 16. Accordingly, by the effect of the magnetic repulsion force developed between the coils 17 and the associated boot bands 15 and 16, the boot bands 15 and 16 can be plastically deformed with their diameter reduced consequently as best shown in FIG. 1B. As a result, the boot anchoring areas 12 and 13 can be firmly clamped between the boot band 15 and the outer joint member 2 and between the boot band 16 and the intermediate portion of the shaft 4, respectively.

FIG. 2 illustrates schematically how the magnetic repulsion force generated, when the electric current is supplied to each coil 17, works on the respective boot band 15 or 16. As shown therein, the magnetic reactive forces F1 and F2 are generated among magnetic fluxes resulting from an eddy current induced in each of the boot band 15, 16 and the magnetic fluxes brought about by the electric current flowing through the respective coil 17. In FIG. 2, the symbol Ma represents lines of magnetic force induced around each coil 17 and the symbol Mb represents lines of magnetic force induced by the eddy current. Thus, it will readily be seen that by the effect of the reactive force F2 functioning as a magnetic repulsion force, each of the boot bands 15 and 16 can be abruptly plastically deformed to have a reduced diameter.

In this case, when the electric current to be supplied to the coils 17 is adjusted, the clamping force developed by the boot bands 15 and 16 can be adjusted, and accordingly, a sufficient gripping of each of the boot anchoring areas 12 and 13 with the boot bands 15 and 16 can be accomplished when the electric current is allowed to flow through the coils 17 a length of time equal to or shorter than $\frac{1}{1,000}$ second. Attention is called that although the boot bands 15 and 16 are heated by the effect of an induction current, a thermal effect on each of the boot anchoring areas 12 and 13 is minimal and can be negligible since the length of time, during which the electric current is supplied to the coils 17, is extremely short.

The extent to which each of the boot bands 15 and 16 is plastically deformed to have a reduced diameter or, in other words, the magnitude of the clamping force exerted by each of the boot bands 15 and 16, is so chosen that the wall thickness of the associated anchoring area 12 and 13 of the boot 11, when clamped by the corresponding boot band 15 and 16 as described above, can be reduced down to 15 to 60% of the initial wall thickness thereof. If the wall thickness of each of the boot anchoring areas 12 and 13, which is reduced by the clamping force exerted by the respective boot bands 15 and 16, is not greater than 15% of the initial wall thickness thereof, the clamping force developed by the boot band 15 and 16 will be so insufficient as to result in a leakage of the grease. But if the wall thickness of each of the boot anchoring areas 12 and 13, which is reduced by the clamping force exerted by the respective boot band 15 and 16, is not smaller than 60% of the initial wall thickness thereof, the boot anchoring area 12 and 13 will be too thinned to allow the boot anchoring areas 12 and 13 to be firmly clamped.

With a boot fixing method according to the foregoing embodiment of the present invention, the magnetic repulsion force is utilized to apply a substantially circumferentially uniform clamping force from the boot bands 15 and 16 to the respective anchoring areas 12 and 13 to firmly sandwich the latter between the boot bands 15, 16 and the respective counterpart members, in specific, between the boot band 15 and the outer joint member 2 and between the boot band 16 and the intermediate portion of the shaft 4, respectively. As a result, a high sealability can be secured at each of the mounting areas where the boot anchoring areas 12 and 13 are engaged on the outer joint member 2 and the intermediate portion of the shaft 4. Also, the boot anchoring areas 12 and 13 of the boot 11 need not have any complicated shape such as observed in the conventional structure thereof and, accordingly, the cost of assemblage will not increase.

As hereinabove described, when a boot fixing method of the present invention is utilized to secure the boot 11 to the constant velocity universal joint 1 with the boot anchoring areas 12 and 13 clamped between the boot band 15 and the outer joint member 2 and between the boot band 16 and the intermediate portion of the shaft 4, respectively, a sufficient sealability can be secured at the mounting areas where the boot anchoring areas 12 and 13 are engaged on the outer joint member 2 and the intermediate portion of the shaft 4. Accordingly, it is possible to assuredly prevent an ingress of foreign matter such as, for example, dusts into the constant velocity universal joint 1 and, also, a leakage of the grease outwardly from the constant velocity universal joint 1.

It is to be noted that although in the embodiment hereinabove discussed, the above described boot fixing method has been shown and described as applied to both of the boot bands 15 and 16 to fasten the boot anchoring areas 12 and 13 around the outer joint member 2 and the intermediate portion of the shaft 4, respectively, a boot fixing method of the present invention can be applied only to one of the boot bands which is positioned on the outboard side, that is, the boot band 15 to fasten only the associated boot anchoring area 12 around the outer joint member 2. Considering that the constant velocity universal joint 1 requires the working angle on the outboard side to be greater than that on the inboard side, application of a boot fixing method of the present invention only to the outboard boot band 15 to firmly fasten the associated anchoring area 12 around the outer joint member 2 can result in an assured prevention of the grease leakage at the associated mounting area where such anchoring area 12 is engaged around the outer joint member 2.

In the practice of the foregoing embodiment of the present invention, since each of the boot bands 15 and 16 is employed in the form of an annulus having a flat outer peripheral surface as hereinbefore described, the boot bands 15 and 16 have a simplified shape. Accordingly, in engaging the boot anchoring area 12 firmly around the outer joint member 2 of the constant velocity universal joint 1 in the manner described above, a relatively large space can be secured around the outer joint member 2 of a type having a limited space.

In addition, since each of the boot bands 15 and 16 employed in the foregoing embodiment of the present invention is so designed as to have a wall thickness of not greater than 3 mm as hereinbefore described, function and effect of plastically deforming the boot bands 15 and 16 by the utilization of the magnetic repulsion force can be obtained easily.

According to the foregoing embodiment of the present invention, since the use is made of the boot bands which are members separate from the constant velocity universal joint, the number of component parts of the constant velocity universal joint tends to increase, accompanied by an increase of the production cost of the constant velocity universal joint. Also, since an extra work is required to plastically deform the boot bands, a substantial length of time is required in assembling the constant velocity universal joint.

Figure 3:
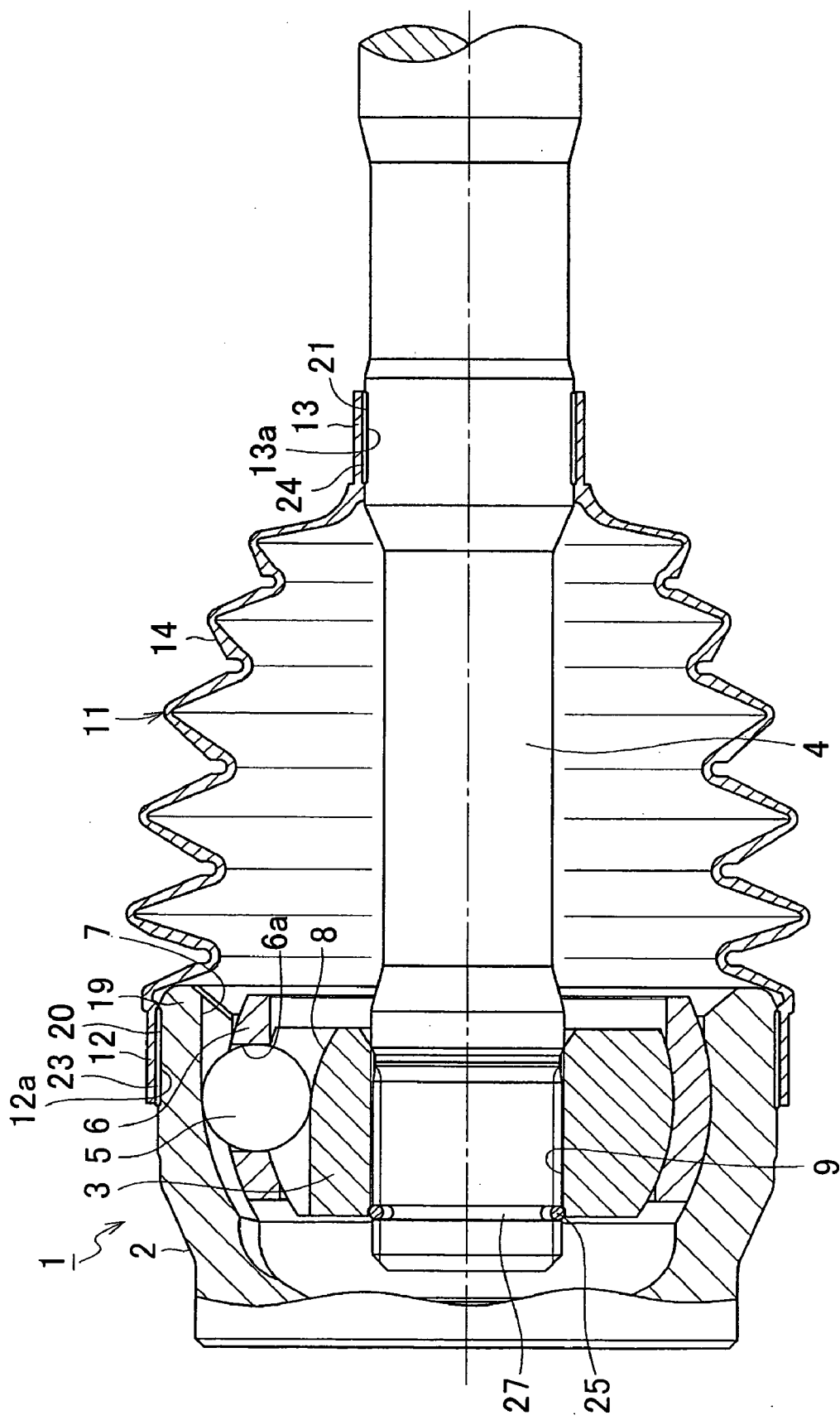
FIG. 3 is a longitudinal sectional view showing a reference example of a boot fixing method of the present invention to the constant velocity universal joint of a different type.
Figure 4:
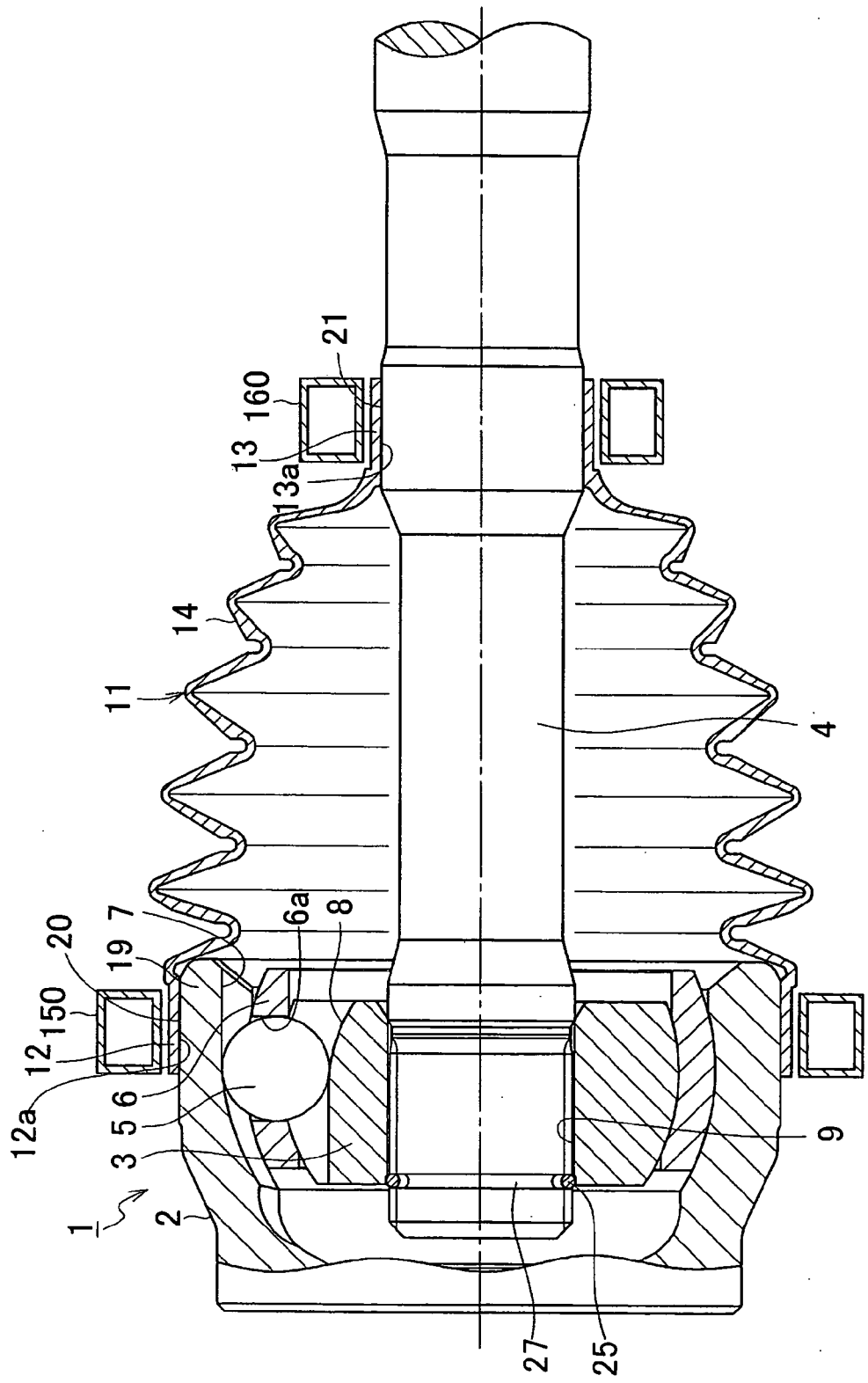
FIG. 4 is a view similar to FIG. 3, showing the reference example of application, in which a high frequency induction welding is employed in the practice of the boot fixing method of FIG. 3.

However, the following reference example, which will be subsequently described with particular reference to FIGS. 3 and 4, provides a method of fixing the flexible boot, in which the use of the boot bands is dispensed with to enable the constant velocity universal joint to be manufactured compact in side and lightweight and at a reduced cost of assemblage. It is to be noted that in the following description, component parts employed therein and similar to those shown and described in connection with the foregoing embodiment of the present invention are designated by like reference numerals used in FIGS. 1A to 2 and, therefore, the details thereof are not reiterated for the sake of brevity.

In FIG. 3, as a reference example of the present invention, the fixed type constant velocity universal joint, to which the boot fixing method according to the reference example is applied, is shown in the form an undercut free type constant velocity universal joint (UJ).

As shown therein, the constant velocity universal joint 1 includes, as principal component parts thereof, an outer joint member 2 which is an outer coupling member, an inner joint member 3 which is an inner coupling member, a plurality of torque transmitting balls 5 and a cage 6 for retaining the balls 5 in a circumferential row, and an inner component unit made up of the inner joint member 3, the torque transmitting balls 5 and the cage 6 is accommodated inside the outer joint member 2.

As is the case with the previously described embodiment of the present invention, the outer joint member 2 having one end open at 19 to the outside is made of a metallic material and has a plurality of curved track grooves 7 defined in an inner semispherical surface thereof. On the other hand, the inner joint member 3 is formed with curved track grooves 8 equal in number to the number of the curved track grooves 7 and defined in an outer semispherical surface thereof and has an axially extending center bore 9 defined therein. A shaft 4 has one end portion inserted into the center bore 9 and splined to the inner joint member 3 for rotation together therewith. The shaft 4 is non-detachably coupled with the inner joint member 3 by means of a circlip 25 engaged in a circumferentially extending mounting groove 27 defined in an outer peripheral surface of that end portion of the shaft 4.

The cage 6 having a circumferential row of pockets 6a defined therein for accommodating the respective torque transmitting balls 5 is positioned intermediate between the outer joint member 2 and the inner joint member 3 so that the torque transmitting balls 5 can be received in part in the track grooves 7 and in part in the track grooves 8 to allow the inner joint member 3 to undergo a rocking motion relative to the outer joint member 2.

It is to be noted that end portions of the curved track grooves 7 and 8, which are defined in the respective inner and outer semispherical surfaces of the outer and inner joint members 2 and 3 and which are positioned adjacent the open end 19 of such outer joint member 2, are formed so as to extend flat in the axial direction whereas end portions of the curved track grooves 7 and 8, which are opposite to and remote from those open end portions 19 thereof, are formed so as to curve. Accordingly, the shaft 4 will hardly interfere with an inner circumferential edge of the open end 19 of the outer joint member 2 even when the constant velocity universal joint 1 during its operation assumes the largest possible working angle. This is one of the characteristics of the fixed type constant velocity universal joint of the undercut free type.

The open end of the outer joint member 2 is covered by a flexible boot 11, and thanks to this flexible boot 11, not only can foreign matter such as, for example, dusts can be prevented from intruding into the constant velocity universal joint 1, and also, a lubricant, filled inside the constant velocity universal joint, can be prevented from leaking therefrom to the outside.

The flexible boot 11 having opposite open ends of different diameters includes a tubular bellows 14 extending between the anchoring areas 12 and 13 at the large and reduced diameter ends thereof. This flexible boot 11 is mounted on the constant velocity universal joint 1 with the large diameter anchoring area 12 and the reduced diameter anchoring area 13 engaged around the open end 19 of the outer joint member 2 and a generally intermediate portion of the shaft 4 that is distant from the inner joint member 3, respectively.

Fixed mounting of the boot anchoring area 12 to the outer joint member 2 is carried out by indirectly heating an outer peripheral surface 20 of the outer joint member 2 to bond an engagement surface 12a, which is an inner peripheral surface of the boot anchoring area 12, to the outer peripheral surface 20 to thereby integrate the engagement surface 12a of the boot anchoring area 12 and the outer peripheral surface 20 of the outer joint member 2 together. On the other hand, fixed mounting of the boot anchoring area 13 to the intermediate portion of the shaft 4 is carried out by indirectly heating an outer peripheral surface 21 of the intermediate portion of the shaft 4 to bond an engagement surface 13a, which is an inner peripheral surface of the boot anchoring area 13, to the outer peripheral surface 21 to thereby integrate the engagement surface 13a of the boot anchoring area 13 and the outer peripheral surface of that intermediate portion of the shaft 4 together.

In this case, since the boot anchoring area 12 at the large diameter end of the boot 11 and the boot anchoring area 13 at the reduced diameter end of the boot 11 can be fixed to the outer joint member 2 and the shaft 4, respectively, with no fixing members such as, for example, boot bands being employed as best shown in FIG. 3, the number of component parts can be reduced to allow the constant velocity universal joint 1 to be assembled at a reduced cost. Also, considering that the use of any fixing members such as the boot bands is dispensed with, the constant velocity universal joint 1 can have a simplified structure and, therefore, reduction in size and weight can be accomplished in the constant velocity universal joint 1.

As means for indirectly heating the outer peripheral surface 20 of the outer joint member 2 and the outer peripheral surface 21 of the intermediate portion of the shaft 4 to thereby integrate by bonding the engagement surfaces 12a and 13a of the boot anchoring areas 12 and 13 together with the outer peripheral surface 20 of the outer joint member 2 and the outer peripheral surface of that intermediate portion of the shaft 4, respectively, a high frequency induction bonding method is employed. It is, however, to be noted that the wording "(to) heat indirectly" or "indirectly heating" referred to above and hereinafter is to be construed as meaning the heating of the outer peripheral surface 20 of the outer joint member 2 or the outer peripheral surface 21 of the intermediate portion of the shaft 4, without applying a heat to any of the outer peripheral surface 20 and the outer peripheral surface 21 of the intermediate portion of the shaft 4.

The high frequency induction bonding method referred to above is a method in which an electroconductive material is heated by the utilization of a high frequency and is performed in a manner which will now be described. At the outset, as shown in FIG. 4, the large diameter anchoring area 12 of the boot 11 and the metallic outer joint member 2, which are overlapped one above the other with the engagement surface 12a held in tight contact with the outer peripheral surface 20, are positioned inside an annular metal coil 150 and, on the other hand, the reduced diameter anchoring area 13 of the boot 11 and the metallic shaft 4, which are overlapped one above the other with the engagement surface 13a held in tight contact with the outer peripheral surface 21 of the intermediate portion of the shaft 4, are positioned inside another annular metal coil 160. Thereafter, a high frequency current is supplied to each of the metal coils 150 and 160.

As the high frequency current is so supplied in the manner described above, a metal part (i.e., the outer peripheral surface 20 of the outer joint member 2 and the outer peripheral surface 21 of the shaft 4), which is an electroconductive material, results in an iron loss (i.e., sum of eddy-current loss plus hysteresis loss) by the effect of the electromagnetic induction, accompanied by an evolution of heat. A resinous part (i.e., the engagement surfaces 12a and 13a of the large and reduced diameter anchoring areas 12 and 13), which is held in contact with the metal part referred to above, has its interface rapidly heated by the heat, which has evolved from the metal part, to a temperature equal to or higher than the decomposing temperature. When the resinous part is so heated as hereinabove described, bubbles are generated. In this way, a condition of high temperature and high pressure is created in a high temperature resin melt present in a region peripheral to the bubbles so generated and a surface of the metal part (i.e., the outer peripheral surface 20 of the outer joint member 2 and the outer peripheral surface 21 of the shaft 4) and, accordingly, as shown in FIG. 3, visually unnoticeable joints 23, 24 can be formed between the engagement surface 12a of the large diameter anchoring area 12 and the outer peripheral surface 20 of the outer joint member 2 and between the engagement surface 13a of the reduced diameter anchoring area 13 and the outer peripheral surface 21 of the shaft 4.

As a result, the engagement surfaces 12a and 13a of the anchoring areas 12 and 13 can be respectively integrated by bonding with the outer peripheral surfaces 20 and 21 of the outer joint member 2 and the shaft 4, wherefore the large diameter anchoring area 12 and the reduced diameter anchoring area 13 can be fixedly mounted around the open end 19 of the outer joint member 2 and the intermediate portion of the shaft 4, respectively.

When the engagement surfaces 12a and 13a of the anchoring areas 12 and 13 are to be integrated by bonding with the outer peripheral surfaces 20 and 21 of the outer joint member 2 and the shaft 4 in the manner described above, only respective surface layer areas of the outer peripheral surfaces 20 and 21 of the outer joint member 2 and the shaft 4 have to be heated, preferably in a heating depth not greater than 0.1 mm.

Accordingly, since the outer peripheral surfaces 20 and 21 of the outer joint member 2 and the shaft 4 once heated can be self-cooled (i.e., naturally cooled) immediately after they have been heated, there is no possibility that integration by bonding of the engagement surface 12a of the boot anchoring area 12 with the outer peripheral surface 20 of the outer joint member 2 and that of the engagement surface 13a of the boot anchoring area 13 with the outer peripheral surface 21 of the shaft 4 cannot take place by melting the engagement surfaces 12a and 13a of the boot anchoring areas 12 and 13 due to heat reserve of the outer peripheral surfaces 20 and 21 of the outer joint member 2 and the shaft 4.

As means for limiting the heating of the outer peripheral surfaces 20 and 21 of the outer joint member 2 and the shaft 4 to only the surface layer areas thereof, either a method of increasing the frequency of an apparatus with which the high frequency induction is performed or a method of reducing the heating time can be employed.

For example, in the reference example of the present invention discussed above, in order to achieve the integration by bonding of the engagement surface 12a of the boot anchoring area 12 with the outer peripheral surface 20 of the outer joint member 2 and that of the engagement surface 13a of the boot anchoring area 13 with the outer peripheral surface 21 of the shaft 4, the respective surface areas of the engagement surfaces 12a and 13a have been heated to about 600° C., the frequency of the high frequency induction apparatus is set to 200 kHz, the high frequency output is set to 160 kW and the heating time is set to 0.2 second.

It is to be noted that when the frequency of the high frequency induction apparatus is set to 200 kHz as is the case with the foregoing reference example, the range of the high frequency output must be in the range of equal to or more than 15 kW and less than 250 kW by the reason which will be described subsequently.

If the high frequency output is less than 15 kW, a tendency can be found that the outer peripheral surfaces 20 and 21 of the outer joint member 2 and the shaft 4 may be heated to a temperature lower than 250° C. and, in such case, heating of the outer peripheral surfaces 20 and 21 of the outer joint member 2 and the shaft 4 will be so insufficient that a boundary portion of the engagement surface 12a of the anchoring area 12 held in contact with the outer peripheral surface 20 of the outer joint member 2 and a boundary portion of the engagement surface 13a of the anchoring area 13 held in contact with the outer peripheral surface 21 of the shaft 4 will not be heated to a temperature equal to or higher than the decomposing temperature and, hence, integration by bonding cannot be achieved between the engagement surface 12a of the boot anchoring area 12 and the outer peripheral surface 20 of the outer joint member 2 and between the engagement surface 13a of the boot anchoring area 13 and the outer peripheral surface 21 of the shaft 4.

On the other hand, if the high frequency output is equal to or higher than 250 kW, a tendency can be found that the outer peripheral surfaces 20 and 21 of the outer joint member 2 and the shaft 4 may be heated to a temperature equal to or higher than 700° C. and, in such case, the outer peripheral surfaces 20 and 21 of the outer joint member 2 and the shaft 4, when so heated, will melt the respective engagement surfaces 12a and 13a of the anchoring areas 12 and 13 and, hence, integration by bonding cannot be achieved between the engagement surface 12a of the boot anchoring area 12 and the outer peripheral surface 20 of the outer joint member 2 and between the engagement surface 13a of the boot anchoring area 13 and the outer peripheral surface 21 of the shaft 4.

It is to be noted that where the frequency of the high frequency induction apparatus is set to 200 kHz and the high frequency output is set to a value within the range of 15 kW to the value lower than 250 kW as is the case with this reference example, the heating time should be restricted to 1 second or smaller. By so doing, since the respective outer peripheral surfaces 20 and 21 of the outer joint member 2 and the shaft 4 can be heated in a small heating depth enough to allow the outer peripheral surfaces 20, 21 to be naturally cooled immediately after have been heated, there is no possibility that the outer peripheral surfaces 20 and 21 of the outer joint member 2 and the shaft 4, when heated, may melt the engagement surfaces 12a and 13a of the boot anchoring areas 12 and 13, and, therefore, integration by bonding can be achieved between the engagement surface 12a of the boot anchoring area 12 and the outer peripheral surface 20 of the outer joint member 2 and between the engagement surface 13a of the boot anchoring area 13 and the outer peripheral surface 21 of the shaft 4.

The flexible boot 11 employed in this reference example in its entirety including the engagement surfaces 12a and 13a of the respective boot anchoring areas 12 and 13 is made of a thermoplastic polyester elastomer by the use of any known molding technique.

It is well known that a thermoplastic polyester elastomer is excellent in mechanical strength and elasticity, has a high heat resistance and a high heat deformation temperature and also has an excellent moldability and, accordingly, the flexible boot 11 made of such thermoplastic polyester elastomer has functionalities afforded by those properties of the material. In particular, since in operation of the constant velocity universal joint 1, the flexible boot 11 is placed under a high temperature environment, formation of the flexible boot 11 having a high heat resistance by molding of a thermoplastic polyester elastomer as is the case with this reference example is an effective means of increasing the durability of such boot 11.

Also, carbon black is added to the material for the flexible boot 11 including a material for the engagement surfaces 12a and 13a of the boot anchoring area 12 and 13.

Carbon black is in the form of carbon particles having a particle size of 3,500 nm, is used as a black pigment and functions as a reinforcement material for resins and rubber. Accordingly, addition of carbon black to the flexible boot 11 such as in the case of this reference example of the present invention renders the boot 11 not only to be black in color, but also to have an increased strength.

It is, however, to be noted that where the carbon black is added to the material for the engagement surfaces 12a and 13a of the boot anchoring area 12 and 13, the high frequency, which is applied by means of high frequency induction to integrate by bonding the engagement surface 12a of the boot anchoring area 12 with the outer peripheral surface 20 of the outer joint member 2 and, also, the engagement surface 13a of the boot anchoring area 13 with the outer peripheral surface 21 of the shaft 4 as is the case with this reference example of the present invention, will not be adversely affected by the presence of the carbon black and, accordingly, the intended integration by bonding can be accomplished normally.

Yet, in this reference example, in the flexible boot 11, a film coating treatment is applied to the respective outer peripheral surfaces 20 and 21 of the outer joint member 2 and the shaft 4.

For the film coating treatment, such means as, for example, a spray coating or Parker treatment (zinc phosphate chemical conversion treatment) can be employed.

According to this film coating treatment, a film such as, for example, a film of zinc phosphate can be formed in the outer peripheral surfaces 20 and 21 to thereby prevent rusting from occurring in those outer peripheral surfaces 20 and 21 of the outer joint member 2 and the shaft 4. As a result thereof, it is possible to avoid the possibility that when the outer peripheral surface 20 of the outer joint member 2 and the outer peripheral surface 21 of the shaft 4 are to be heated indirectly, the process of indirectly heating those outer peripheral surface 20 and 21 by means of high frequency induction cannot be performed normally due to rusting occurring in those outer peripheral surfaces 20 and 21.

It is also to be noted that although in this reference example, the outer joint member 2 in its entirety including the outer peripheral surface 20 thereof is made of a carbon steel for machine manufacture such as, for example, S53C (or G4051 according to the JIS (Japanese Industrial Standards) designation), the material for the outer joint member 2 may not be limited thereto and, where this reference example is to be worked out, material satisfying the following compositions can be employed in molding the outer peripheral surface 20 of the outer joint member 2. It is to be noted that the numeric values in the following composition represent percent by weight (wt %).

| | |
|---|---|
| Carbon (C): 0.50 to 0.56 | Silicon (Si): 0.10 to 0.40 |
| Manganese (Mn): 0.97 to 1.10 | Phosphorous (P): 0.03 or smaller |
| Sulfur (S): 0.04 or smaller | Chromium (Cr): 0.1 to 0.25 |
| Copper (Cu): 0.3 or smaller | Nickel (Ni): 0.2 or smaller |

Also, in this reference example, the shaft 4 in its entirety including the outer peripheral surface 21 thereof is made of a carbon steel for machine manufacture such as S40C (or G4051 according to the JIS designation) or SBM40 based on S40C, which contains boron and having an increased amount of manganese when compared to S40C, but the material for the shaft 4 may not be limited thereto and, where this reference example is to be worked out, material satisfying the following compositions can be employed in molding the outer peripheral surface 21 of the shaft 4. It is to be noted that the numeric values in the following composition represent percent by weight (wt %).

| | |
|---|---|
| Carbon (C): 0.30 to 0.45 | Silicon (Si): 0.35 or smaller |
| Manganese (Mn): 0.80 to 1.40 | Phosphorous (P): 0.03 or smaller |
| Sulfur (S): 0.01 to 0.04 | Chromium (Cr): 0.2 or smaller |
| Copper (Cu): 0.4 or smaller | Boron (B): 0.004 or smaller |
| Nickel (Ni): 0.3 or smaller | |

Figure 5:
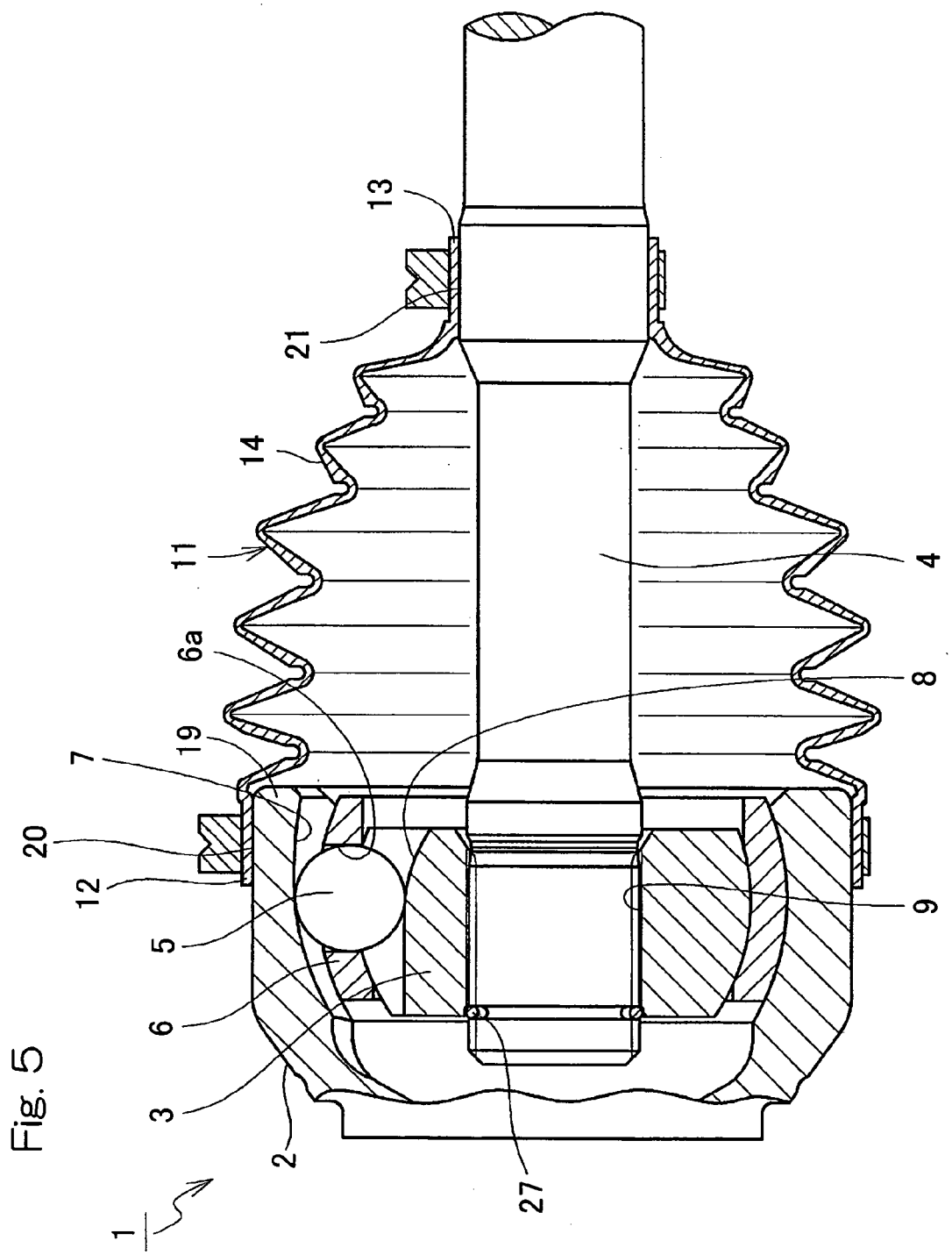
FIG. 5 is a longitudinal sectional view showing another reference example of a boot fixing method of the present invention to the constant velocity universal joint of a further different type.

In describing the foregoing reference example, reference has been made to an undercut free type constant velocity universal joint (UJ), which is one of fixed-type constant velocity universal joints, but this reference example can be equally applicable to a fixed-type constant velocity universal joint of such a ball-fixed type as shown in FIG. 5. Also, the present invention can be applied not only to fixed-type constant velocity universal joints, but also to any known constant velocity universal joint of a sliding type.

It is to be noted that although in the reference example hereinabove discussed, the above described boot fixing method has been shown and described as applied to both of the boot bands 15 and 16 to fasten the boot anchoring areas 12 and 13 around the outer joint member 2 and the intermediate portion of the shaft 4, respectively, this boot fixing method of the present invention can be applied only to one of the boot bands which is positioned on the outboard side, that is, the boot band 15 to fasten only the associated boot anchoring area 12 around the outer joint member 2.

The foregoing reference example includes the following modes.

[Mode 1]

This mode 1 is a boot fixing method for the boot, made of a resinous material, for the constant velocity universal joint, which is fixedly mounted on one end of a counterpart member made of a metallic material. Fixed mounting of an anchoring area, provided in one end of the flexible boot, on the counterpart member is carried out by indirectly heating a to-be-fitted surface of the counterpart member so that an engagement surface of the boot anchoring area can be integrated by bonding with the to-be-fitted surface of the counterpart member.

According to this mode 1, since the to-be-fitted surface of the counterpart member made of metal is indirectly heated so that by the utilization of the heat evolved therefrom the engagement surface of the boot anchoring area and the to-be-fitted surface of the counterpart member can be integrated together by bonding, the boot anchoring area can be fixedly mounted on the counterpart member. It is to be noted that the wording "(to) heat indirectly" or "indirectly heating" referred to above and hereinafter is to be construed as meaning the heating of the to-be-fitted surface of the counterpart member without applying a heat directly thereto. Also, the wording "fixed mounting" or "fixedly mounted" is to be construed as meaning that the boot anchoring area can be fitted to and fixed on the counterpart member without relying on the use of any other component parts or the like.

[Mode 2]

In the mode 1 described above, indirect heating of the to-be-fitted surface of the counterpart member is preferably carried out by means of high frequency induction.

The high frequency induction referred to above is a method of heating only an electroconductive material and is carried out by supplying a high-frequency electric current through a coil while the engagement surface of the boot anchoring area and the to-be-fitted surface of the counterpart member, which are tightly overlapped one above the other with the former positioned above the latter, is positioned inside the coil. In this case, the to-be-fitted surface of the counterpart member, which is made of a metallic material, that is, has an electroconductive property, can be indirectly heated by the high frequency through the boot anchoring area and bubbles are generated under the influence of heat, evolved from the to-be-fitted surface of the counterpart member, at the boundary portion of the engagement surface of the boot anchoring area then held in contact with the to-be-fitted surface of the counterpart member, wherefore the engagement surface of the boot anchoring area and the to-be-fitted surface of the counterpart member can be integrated together by bonding. As a result thereof, with no need to use any fixing component parts such as the boot band, the boot anchoring area of the boot can be fixedly mounted on the counterpart member.

[Mode 3]

In the mode 2 referred to above, the high frequency induction is preferably used to only heat a surface layer region of the to-be-fitted surface of the counterpart member.

The reason therefor is that if the heating depth (the depth of a heated portion from a surface layer thereof), to which the to-be-fitted surface of the counterpart member is heated, is large, that is, if the heated portion of the to-be-fitted surface of the counterpart member is not only a surface layer region thereof, the to-be-fitted surface of the heated counterpart member will be unable to self-cool and a resinous component of the flexible boot will therefore be melted under the influence of heat evolved therefrom and, accordingly, integration by bonding of the engagement surface of the boot anchoring area with the to-be-fitted surface of the counterpart member will be insufficient.

[Mode 4]

In the mode 1 referred to above, the material for the engagement surface of the boot anchoring area is preferably a thermoplastic polyester elastomer.

Thermoplastic polyester elastomer is excellent in mechanical strength, moldability and elasticity, and is, therefore, considered preferable as a material effective to provide the flexible boot with a required functionality such as, for example, flexure durability or the like. Also, the thermoplastic polyester elastomer is difficult to deform and has a high heat resistance and, therefore, when this material is used to form the flexible boot that is placed under a high temperature environment during the operation of the constant velocity universal joint, any undesirable reduction in durability of the flexible boot, which would occur under the influence of a high temperature, can be avoided.

[Mode 5]

In the mode 1 referred to above, carbon black is preferably added to the material for the engagement surface of the boot anchoring area.

Addition of carbon black to the flexible boot is effective to render the boot not only to be black in color, but also to increase the strength of the boot anchoring area. It is, however, to be noted that where the carbon black is added to the material for the engagement surface, the high frequency, which is applied by means of high frequency induction to integrate by bonding the engagement surface of the boot anchoring area with the to-be-fitted surface of the counterpart member as hereinbefore described, will not be adversely affected by the presence of the carbon black and, accordingly, the bonding by the use of the high frequency will not be hampered.

[Mode 6]

In the mode 1 referred to above, the to-be-fitted surface of the counterpart member is preferably subjected to a film coating treatment.

As described previously, when the film coating treatment is performed on the to-be-fitted surface of the counterpart member by means of, for example, a spray coating or Parker treatment, there is no possibility that the integration by bonding of the engagement surface of the boot anchoring area with the to-be-fitted surface of the counterpart member will be hampered by the presence of rusting in the to-be-fitted surface of the counterpart member.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A method for fixing a boot to a counterpart member, comprising:

mounting a tubular anchoring area, defined in one end of the boot made of a resinous material, on an outer periphery of the counterpart member;

applying a clamping force to a boot band mounted around an outer periphery of the tubular anchoring area to thereby fix the tubular anchoring area to the outer periphery of the counterpart member; and positioning around the outer periphery of the boot band, a magnetic generating device for applying a magnetic repulsion force to the tubular anchoring area to thereby enable the boot band to be plastically deformed to have a reduced diameter by means of the magnetic repulsion force, whereby the tubular anchoring area is fixed to the outer periphery of the counterpart member.

2. The method as claimed in claim 1, wherein the magnetic generating device comprises a coil, which generates an induction current in the boot band, when an electric current is supplied to the coil, to cause the magnetic repulsion force to be developed between the coil and the boot band.

3. The method as claimed in claim 1, wherein the counterpart member comprises one or both of a shaft, which is mounted on an inner periphery of an inner joint member of a constant velocity universal joint comprising the inner joint member and an outer joint member that are relatively rotatably connected with each other for transmission of a torque therebetween, and the outer joint member of the constant velocity universal joint.

4. The method as claimed in claim 1, wherein the boot band is in the form of an annulus having a flat outer peripheral surface over an entire circumference thereof.

5. The method as claimed in claim 1, wherein the boot band is made of an aluminum or a stainless steel.

6. The method as claimed in claim 1, wherein the boot band has a wall thickness not greater than 3 mm.

7. The method as claimed in claim 1, wherein the boot is made of an elastomer, and an extent to which each of the boot bands is plastically deformed to have the reduced diameter is so chosen that a wall thickness of the associated anchoring area of the boot can be reduced down to 15 to 60% of the initial wall thickness thereof.

* * * * *